United States Patent
Agrawal

(10) Patent No.: US 7,568,045 B1
(45) Date of Patent: Jul. 28, 2009

(54) METHOD AND APPARATUS FOR ESTIMATING PERIODIC WORST-CASE DELAY UNDER ACTUAL AND HYPOTHETICAL CONDITIONS USING A MEASUREMENT BASED TRAFFIC PROFILE

(75) Inventor: Sanjay K. Agrawal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 613 days.

(21) Appl. No.: 09/823,429

(22) Filed: Mar. 30, 2001

(51) Int. Cl.
*G06F 15/16* (2006.01)
*G06F 15/173* (2006.01)

(52) U.S. Cl. .................... 709/233; 709/223

(58) Field of Classification Search ........... 370/252, 370/235, 230, 230.1; 709/227, 230, 223, 709/102, 200, 233
See application file for complete search history.

(56) References Cited

U.S. PATENT DOCUMENTS

| | | | |
|---|---|---|---|
| 6,192,032 B1 * | 2/2001 | Izquierdo .................... 370/230 |
| 6,226,266 B1 * | 5/2001 | Galand et al. ................ 370/235 |
| 6,430,160 B1 * | 8/2002 | Smith et al. .................. 370/252 |
| 6,587,878 B1 * | 7/2003 | Merriam ...................... 709/224 |
| 6,657,987 B1 * | 12/2003 | Kumar et al. ................ 370/346 |
| 6,687,223 B1 * | 2/2004 | Sajadieh et al. ............. 370/230 |
| 6,757,255 B1 * | 6/2004 | Aoki et al. ................... 370/252 |
| 6,928,473 B1 * | 8/2005 | Sundaram et al. ........... 709/224 |
| 2002/0073224 A1 * | 6/2002 | Varma et al. ................ 709/233 |
| 2002/0097726 A1 * | 7/2002 | Garcia-Luna-Aceves et al. ...................... 370/395.31 |
| 2002/0194343 A1 * | 12/2002 | Shenoi et al. ................ 709/227 |

OTHER PUBLICATIONS

Puqi Perry Tang and Tsung-Yuan Charles Tai, "Network Traffic Characterization Using Token Bucket Model" 1999, Intel Architecture Labs.*
"Network Traffic Characterization Using Token Bucket Model" by Puqi Perry Tang and Tsung-Yuan Charles Tsai, IEEE, 1999, IEEE Infocomm Proceedings 1998, pp. 51-62.

* cited by examiner

*Primary Examiner*—Patrice Winder
*Assistant Examiner*—Karen C Tang
(74) *Attorney, Agent, or Firm*—Cindy Kaplan

(57) ABSTRACT

Methods and apparatuses for estimating periodic worst-case delay for a class of traffic. An aggregate (i.e., a class or label on which traffic is classified and queued) has an associated bandwidth ("negotiated rate"), which typically is a maximum average bandwidth that has been agreed upon by the traffic generator ("customer") and service provider. Delay for an aggregate is obtained by summing all the delays of class queues of each router in the path. Traffic data for the aggregate is collected. A burst-rate profile is calculated for the traffic data, with the rate parameter set to the value of the negotiated rate. A periodic worst-case delay estimate associated with the burst-rate profile is calculated, using the output link capacity allotted to the aggregate ("allocated bandwidth") as input.

30 Claims, 12 Drawing Sheets

METHOD AND APPARATUS FOR ESTIMATING PERIODIC WORST-CASE DELAY UNDER ACTUAL AND HYPOTHETICAL CONDITIONS USING A MEASUREMENT BASED TRAFFIC PROFILE

BACKGROUND OF THE INVENTION

The present invention relates to evaluation of network performance and resource allocation. Specifically, worst-case queuing delay for aggregates of traffic can be measured using a measurement based traffic profile. Periodic worst-case delay under hypothetical traffic conditions and allocations of bandwidth can be estimated.

A key measure of network performance is delay. The average delay in any acceptable modern day network is low, and the exact value of the average typically is of limited use in comparing similar services. In addition, averaging masks extreme values, but the extreme high values (occasional large delays) can be very annoying to a typical user. That is, in evaluating actual user experience, the periodic worst-case delay estimation can be important.

Average delay can be measured by exchanging probe packets between each of a specified pair of routers using a tool, such as Cisco's Service Assurance Agent. Another tool, such as Cisco's Internet Performance Monitor, can be used to collect and process the data obtained and make it available to other applications. Such end-to-end probing schemes have several drawbacks, including increasing as the square of the number of nodes in the network and consequently not scalable to large N; also, the probes themselves use network resources and therefore can affect performance. In addition, end-to-end measurements schemes do not provide a periodic worst-case delay.

Average delay and periodic worst-case delay can be obtained by direct measurement. Every packet passing through a queue in a time interval can be directly monitored to determine packet delay. For example, a time stamp can be inserted into the header of each packet upon arrival. The delay until the packet leaves the queue can be calculated by monitoring when the packet leaves the queue and comparing it to the time stamped arrival time. The delays for all packets can be averaged to give an average delay for the time interval. The largest delay can be identified as the actual periodic worst-case delay. However, direct measurement is cumbersome.

A further limitation of both end-to-end probing schemes and direct measurement is that they only provide information about current conditions. They do not predict how the system will perform under different traffic conditions, or how the system will perform with a different allocation of resources. Being able to analyze network performance under hypothetical conditions would be useful, for example when a customer and internet service provider agree to the customer sending increased voice and video traffic. Such traffic is burstier than data traffic. It would be useful to be able to estimate the effect of an increase in bursty traffic on delay. Also, it would be useful to be able to tell how much additional bandwidth is needed to achieve a certain reduction in delay with existing traffic.

Accordingly, it would be useful to conveniently obtain an estimate of periodic worst-case delay, in a way that is scalable to large networks, and in a way that does not disrupt normal network performance. It would further be desirable for the method to be rapidly adaptable to real time changes in traffic conditions. It would be useful to be able to analyze worst-case delay under hypothetical conditions such as different output link bandwidth allocations.

SUMMARY OF THE INVENTION

Embodiments of the invention provide methods and apparatuses for estimating periodic worst-case delay for a class of traffic. An aggregate (i.e., a class or label on which traffic is classified and queued) has an associated bandwidth ("negotiated rate"), which typically is a maximum average bandwidth that has been agreed upon by the traffic generator ("customer") and service provider. Delay for an aggregate is obtained by summing all the delays of class queues of each router in the path. Traffic data for the aggregate is collected. A burst-rate profile is calculated for the traffic data, with the rate parameter set to the value of the negotiated rate. A periodic worst-case delay estimate associated with the burst-rate profile is calculated, using the output link capacity allotted to the aggregate ("allocated bandwidth") as input. In one embodiment, the periodic worst-case delay for a path in the network can be estimated by adding up the periodic worst delay for each router along the path. In another embodiment, a hypothetical value of allocated bandwidth can be used in the delay calculation to determine the effect of reallocation of output link bandwidth on delay. In another embodiment, the rate parameter is set to a selected hypothetical value, and a burst parameter is calculated. Using the rate parameter and burst parameter, an estimate of periodic worst case delay corresponding to the hypothetical output link rate is determined.

In an embodiment of the invention, in a packet switched computer network, a method of estimating periodic worst-case delay for an aggregate of traffic is provided. Traffic data for the aggregate is collected. A traffic profile is calculated for the collected traffic data. A periodic worst-case delay is calculated for the traffic profile. Preferably the traffic profile is a burst-rate profile determined by a burst parameter and a rate parameter. The rate parameter is set to a known bandwidth, such as an estimated average or maximum average, associated with the traffic. Preferably the rate parameter is set to the negotiated rate of the traffic aggregate. Preferably the worst case delay is calculated by dividing the burst parameter by a allocated bandwidth associated with the aggregate.

In an embodiment of the invention, periodic worst-case queuing delay for a path is estimated. Traffic parameters from a plurality of routers are periodically collected. A periodic worst case delay estimate associated with the traffic parameters is calculated for each router along the path. The calculated values are added to obtain a path delay.

A further understanding of the nature and advantages of the inventions herein may be realized by reference to the remaining portions of the specification and the attached drawings.

DESCRIPTION OF SPECIFIC EMBODIMENTS

Figure 1A:
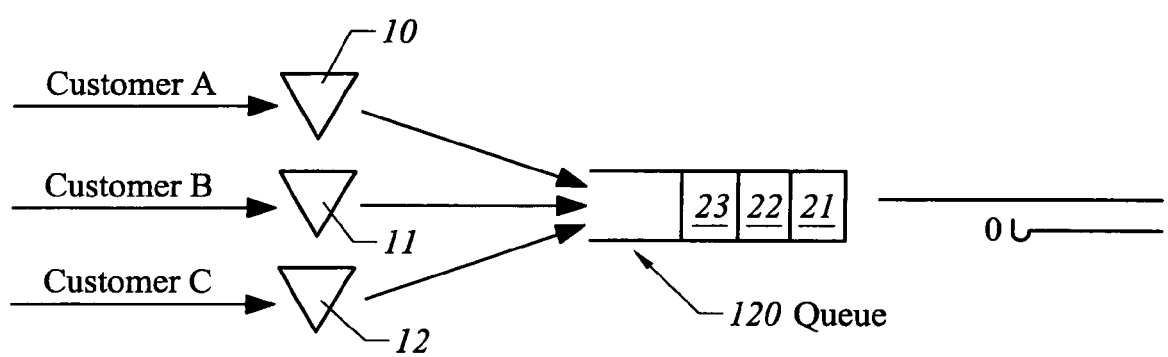
FIG. 1A is an example schematic diagram of traffic handling.

Embodiments of the invention are described below with reference to specific processing systems and methods. However, embodiments of the invention can be implemented in various ways. For example, aspects of the invention can be implemented in software or hardware or using special purpose processors or by any other known mechanism. Therefore, the description of the embodiments that follows is for purposes of illustration and not limitation.

Overview

Embodiments of the invention can be practiced in the context of a company or individual ("customer") buying Internet service from a service provider ("provider"). For purposes of illustration only, embodiments of the invention are described in this context. Embodiments of the invention can be practiced in the context of any network, however.

A customer and provider typically agree upon specified levels of service for items such as connectivity, latency, bandwidth, and packet loss (a "service level specification"), and embody the agreement in a Service Level Agreement ("SLA"). The specified items typically include a maximum average bandwidth (the amount of bandwidth purchased by the customer, also called for convenience herein the "negotiated rate" or "average send rate") and maximum burst size to be sent by the customer for certain aggregates of traffic. More detailed agreements commonly also specify average bandwidths and maximum burst sizes for several classes of traffic.

The term "negotiated rate" is used herein preferably to refer to a maximum average bandwidth specified in the SLA. However, any measure of bandwidth, such as an estimated average or actual average can also be used.

The term "aggregate" is used herein to refer to a class or other label based on which traffic is classified and queued.

The provider typically polices customer traffic as known in the art. Traffic that exceeds the SLA is dropped, reclassified or otherwise dealt with in accordance with the SLA. Traffic leaving a policer is in conformance with the SLA.

After policing, traffic is queued and sent out of the router on an output link. The output link has an associated bandwidth (also called herein the "link capacity", "output link rate" or "output link bandwidth"). Multiple queues, including multiple logical queues, can share an output link, with each queue allotted a share of the output link bandwidth, as known in the art. The output link typically is coupled to multiple output interfaces and packets are routed to one output interface via the output link.

The term "allocated bandwidth" refers herein to the share of the output link rate allotted to a given queue, as known in the art.

A simple illustration of a system where traffic is aggregated by customer is briefly described here. Referring to FIG. 1, traffic from customers A, B, and C arrives at a router and each traffic stream is policed according to the applicable SLA by policers 10, 11, and 12, respectively. After policing, each of the three traffic streams has been constrained not to exceed the bandwidth specified in the SLA, i.e. the negotiated rate, typically specified as an average rate.

The traffic streams are sent to queue 120. In a preferred embodiment, queue 120 is a physical queue, with each traffic stream being stored using a separate logical queue, as known in the art. Preferably three logical queues associated with physical queue 120 store the traffic from customers A, B, and C, respectively in the example being discussed. Other configurations of queues can be used, such as sending each traffic stream to a separate physical queue in a class-based queuing architecture of flow-based queuing architecture. Waiting to be scheduled is typically the major component of delay in transmission time.

The packets in each logical queue are scheduled and sent out of the queue, preferably using a deficit round robin algorithm, or strict priority, as known in the art.

Queue 120 is coupled to an output link having an output link having a link capacity. The link capacity is apportioned among the various queues associated with the output link. In a preferred embodiment, each logical queue corresponding to a customer is allotted a portion of the output link capacity (the allocated bandwidth). The allotted portion of the output link capacity should exceed or equal the negotiated rate of the traffic in the queue, as known in the art. For example, the allocated bandwidth associated with the logical queue in which packets from Customer A are stored, should exceed the negotiated rate of Customer A.

A periodic worst case delay is calculated for a traffic aggregate, such as Customer A. The traffic is monitored and the arrival time and packet size of each packet arriving at the corresponding queue (e.g. Customer A logical queue) is recorded, during some interval of time, such as 60 milliseconds. For this set of data, a traffic profile is calculated, preferably a rate-burst profile having two parameters, rate parameter r and burst parameter b, as described below. The value of rate parameter r is set to be the negotiated rate for the traffic, and a value for a burst parameter b is calculated using known methods. Note that setting the rate parameter to the negotiated rate is conservative, as the allocated bandwidth should at least equal the negotiated rate.

Once the values of r and b are known, the worst case delay for such a traffic profile can be estimated as the burst parameter divided by the allocated bandwidth. Intuitively, the worst case will be if a burst equal to the maximum burst b arrives when there is no capacity to send it. The amount of time to accumulate capacity to send this burst is at most the burst size b divided by the allocated bandwidth.

Figure 1B:
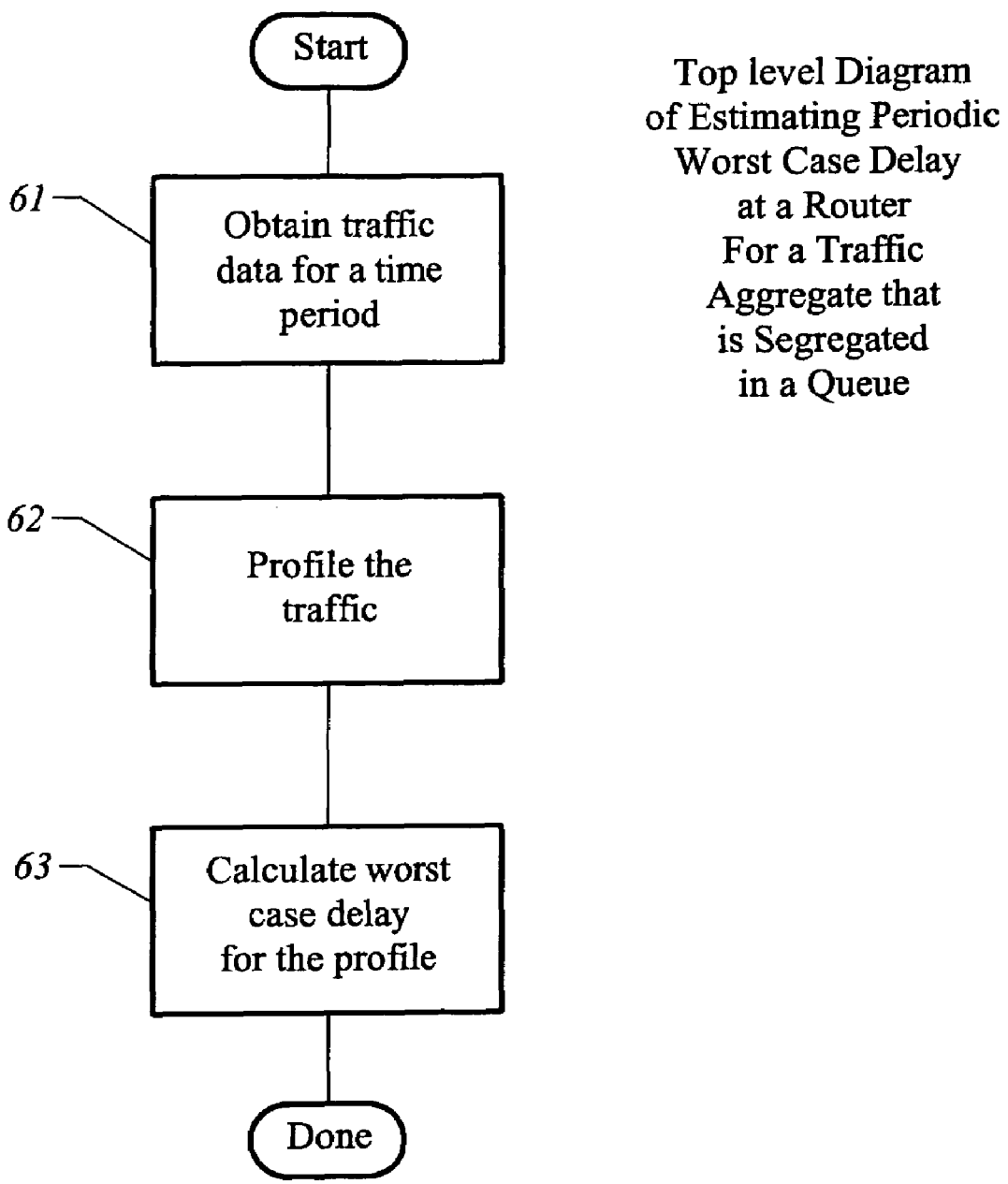
FIG. 1B is a top level diagram of estimating worst case delay at a router.

A top level diagram of the process is shown in FIG. 1B. At a step 61, traffic data for a time period is obtained. At a step 62, the traffic is profiled. At a step 63 the worst case delay is calculated for the traffic profile.

Note that although the illustrative example includes policing of the traffic, at any given router policing need not be done and embodiments of the invention can still be practiced. For example, policing commonly is not done at internal (non-edge) routers in a network. Also, in a wholly internal network, policing need not necessarily be implemented. Additionally or alternatively, the negotiated rate can replaced by any estimate of rate such as average rate or maximum average rate.

The illustrative example above relates to determining worst case delay for customer queues. However, embodiments of the invention can be implemented with other aggregates of traffic, such as in a system where queues are class based (i.e. traffic is separated by class). In such a case, the provider can select an attribute, sort and queue traffic on the attribute, monitor traffic, and obtain traffic parameters for the traffic aggregate.

In such a manner, for an aggregate of traffic, a periodic worst-case queuing delay at each node in a network can be calculated. Values for each node can be periodically collected. To calculate a periodic worst-case delay for a path, the periodic worst-case delay at each router in the path can be summed.

In another embodiment, the effect of a change in bandwidth allocation by the provider can be calculated for a set of traffic data. The rate parameter is assumed to be a known negotiated rate. A burst size b fitting the traffic data is calculated. A predicted worst-case delay can be calculated by dividing the parameter b by the hypothetical bandwidth allocation. A service provider can for example use this value to determine how much additional bandwidth to allocate to a class to achieve a desired decrease in delay. In another embodiment, the rate parameter can be set to a hypothetical negotiated rate and similar calculations performed. The burst size is useful for calculating overall burstiness of traffic.

Traffic Profiling

Embodiments of the invention use traffic profiling. It is known to profile a set of traffic data using a token bucket. A token bucket uses two parameters: token bucket size ("b") and token replenishment rate "r". The token bucket size b can be thought of as a maximum burst size b—the largest burst size in the traffic data profiled will not exceed b.

Figure 2:
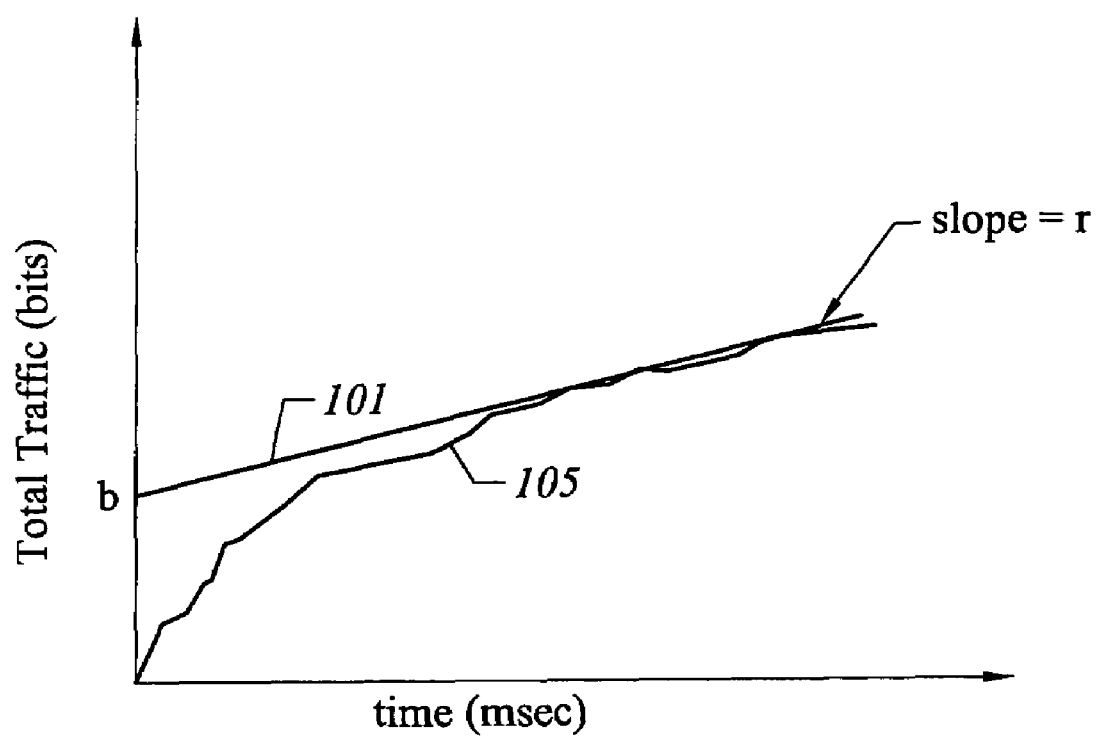
FIG. 2 is a diagram of a traffic sample and burst-rate profile.

A sample burst-rate traffic profile 101 fitting example traffic 105 is shown in FIG. 2. The burst-rate traffic profile 101 is a straight line with y-intercept b, and slope r. The units of b are quantity of traffic, e.g. bits, and the units of r are traffic per time, e.g. bits per second.

Example traffic 105 is shown as an irregular, monotonically increasing curve, and represents the total number of bits (traffic) that has arrived at a queue during a time interval. Preferably, the traffic profile 101 is fitted such that its value is greater than the value of the traffic data 105 at all times, although this is not necessary.

Methods for computing a token bucket parameter b given a value of r (and vice versa) are described in "Network Traffic Characterization Using Token Bucket Model" by Puqi Perry Tang and Tsung-Yuan Charles Tai, published by IEEE in 1999 in IEEE Infocomm Proceedings 1998, pages 51-62, which is hereby incorporated by reference in its entirety. Tang provides several algorithms for calculating a best value for token bucket size (maximum burst size) b given a value of r, and any of these algorithms can be used in embodiments of the invention. Preferably, the "no-delay requirement" algorithm described by Tang and Tai is used. However, any known methods for calculating parameters b and r can be used, including other algorithms for calculating a maximum burst size b given a value of r. As can be seen from looking at FIG. 2, if a large value of r is assumed, a smaller value of b results for given traffic data, and vice versa.

It is also useful to note that the Tang algorithm can be applied at a policer that uses token bucket policing, as known in the art, (instead of application at the queue) to achieve real-time traffic profiling, and the token bucket size at the policer can then be optimized.

Detailed Description

The following describes handling of traffic in an example router in a provider network to provide a context for embodiments of the invention. However, embodiments can be implemented in routers with other configurations and in internal or non-provider networks.

For illustrative purposes, we describe here an embodiment of the invention practiced in a system employing class based queues. In the following description, each queue in a router corresponds to a class of traffic, preferably with the class indicated by the value of the priority field in the packet header, as known in the art (specified for example by TCP/IP or UDP protocols). It is to be noted that embodiments of the invention can be practiced with various other aggregates of traffic including customer based queues.

Figure 3:
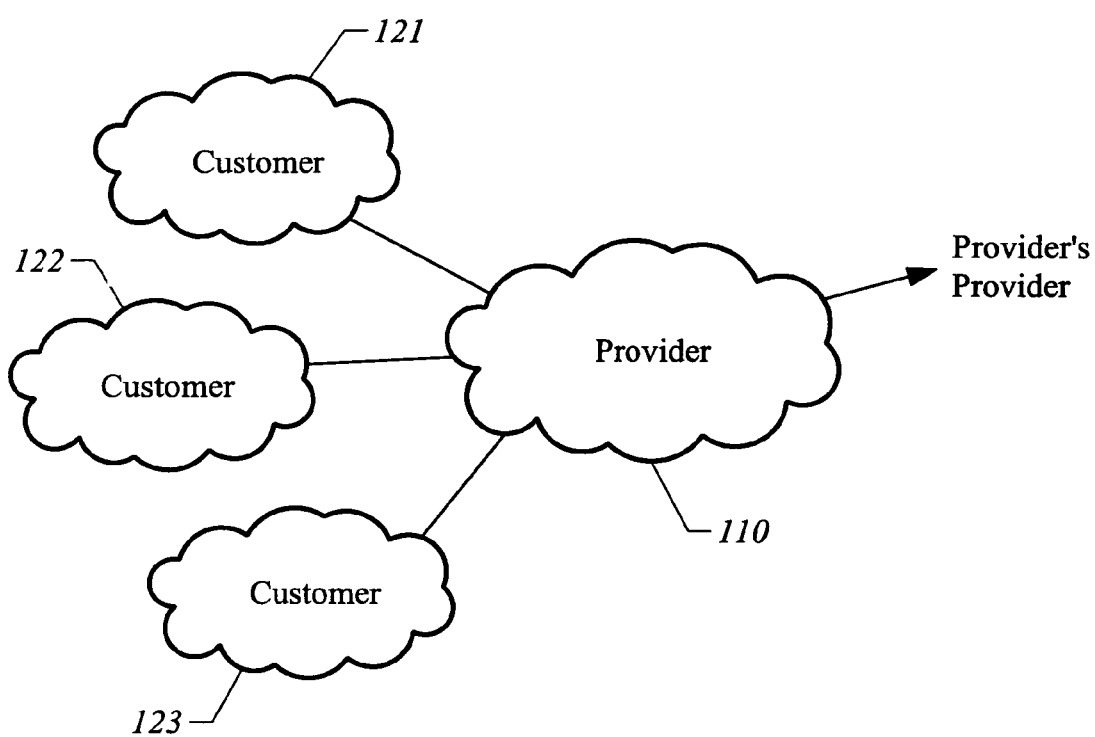
FIG. 3 is an illustration of a portion of a network including customer networks and a provider network.

FIG. 3 is an illustration of a network including a plurality of customer networks 121, 122, 123, who obtain Internet service from a provider network 110. The provider network 110 in turn can obtain service from a larger provider. The provider network 110 and customer networks 121, 122, 123, can each include computers, routers, and other devices. One or more of the customer networks can alternately consist of a single computer with communication devices. The provider and customer preferably have a service level agreement (SLA) specifying for example levels of connectivity, latency, bandwidth, and packet loss. The SLA in the embodiments discussed here includes negotiated rates (preferably a maximum average rate that the customer is allowed to send) for one or more classes of traffic.

Figure 4:
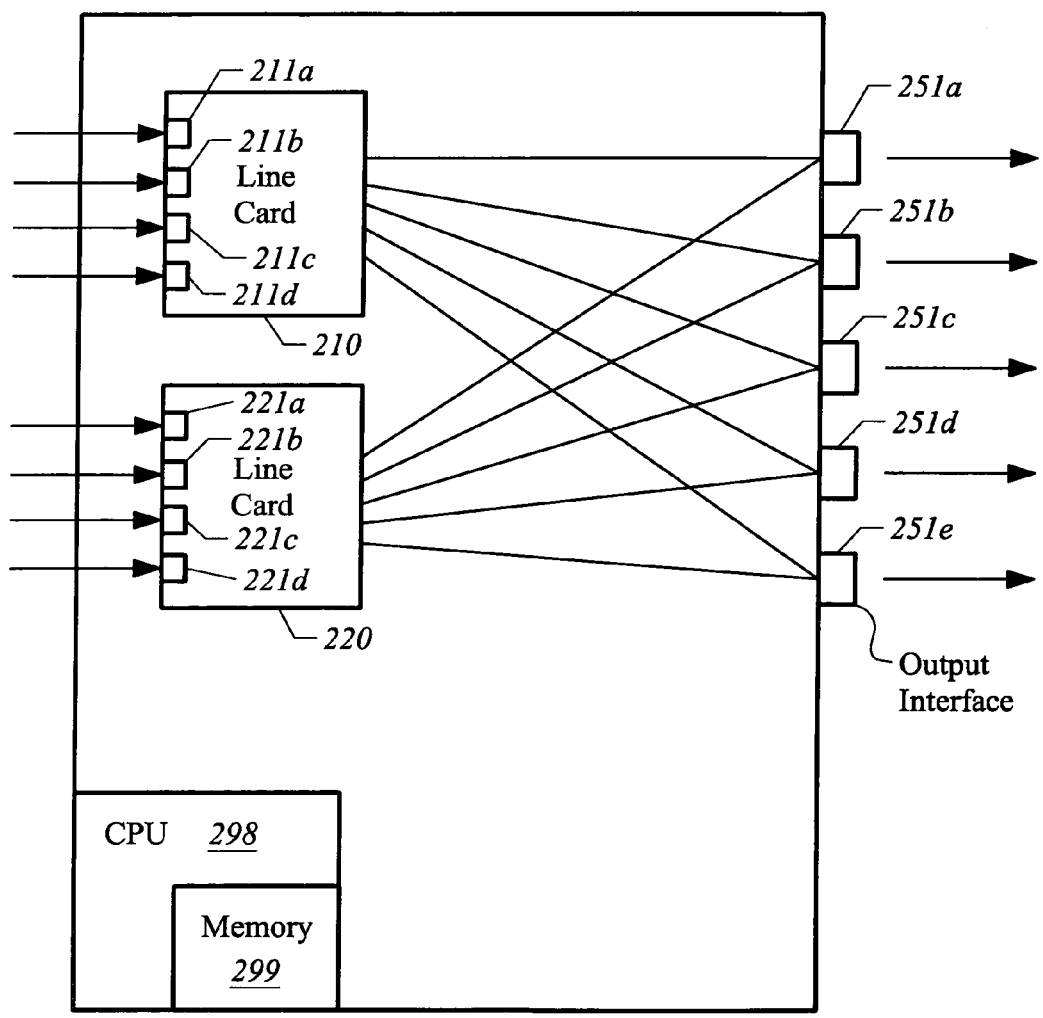
FIG. 4 is a simplified diagram of an example router showing input interfaces and output interfaces.

Traffic from a customer enters the provider network through an entry point. Typically, the traffic enters through an edge router. A simplified edge router 200 is shown in FIG. 4. The edge router 200 shown includes multiple lines cards 210, 220 that include multiple input interfaces 211a-211d. The edge router 200 includes multiple output interfaces 251a-251e. Every input interface is capable of being coupled to every output interface in the edge router shown. The input interfaces and output interfaces are coupled via a bus (not shown) to a central processing unit 298 which includes non-volatile memory 299. The memory 299 includes a computer readable medium coupled to the processor 298 and storing a computer program comprising code. The code causes the processor 298 to perform operations in accordance with the embodiments described herein. The computer readable medium may be a CD-ROM, floppy disk, flash memory, system memory, or hard drive, for example. The edge router shown is but an example of a customer/provider interface and any known methods can be used, including routers having a different configuration.

The ability to move packets from line careds 210, 220 to output interfaces 251a-251e is the output link capacity discussed with reference to FIG. 1A above.

A line card with multiple input interfaces can be dedicated to traffic from a single customer, as shown in FIG. 3. Alternately or additionally, one or more physical ports can be dedicated to traffic from a single customer. Alternately or additionally, one or more physical ports can be associated with one or more logical ports. For example, a single physical port can be associated with two logical ports, each logical port associated with a different customer, as known in the art.

Figure 5:
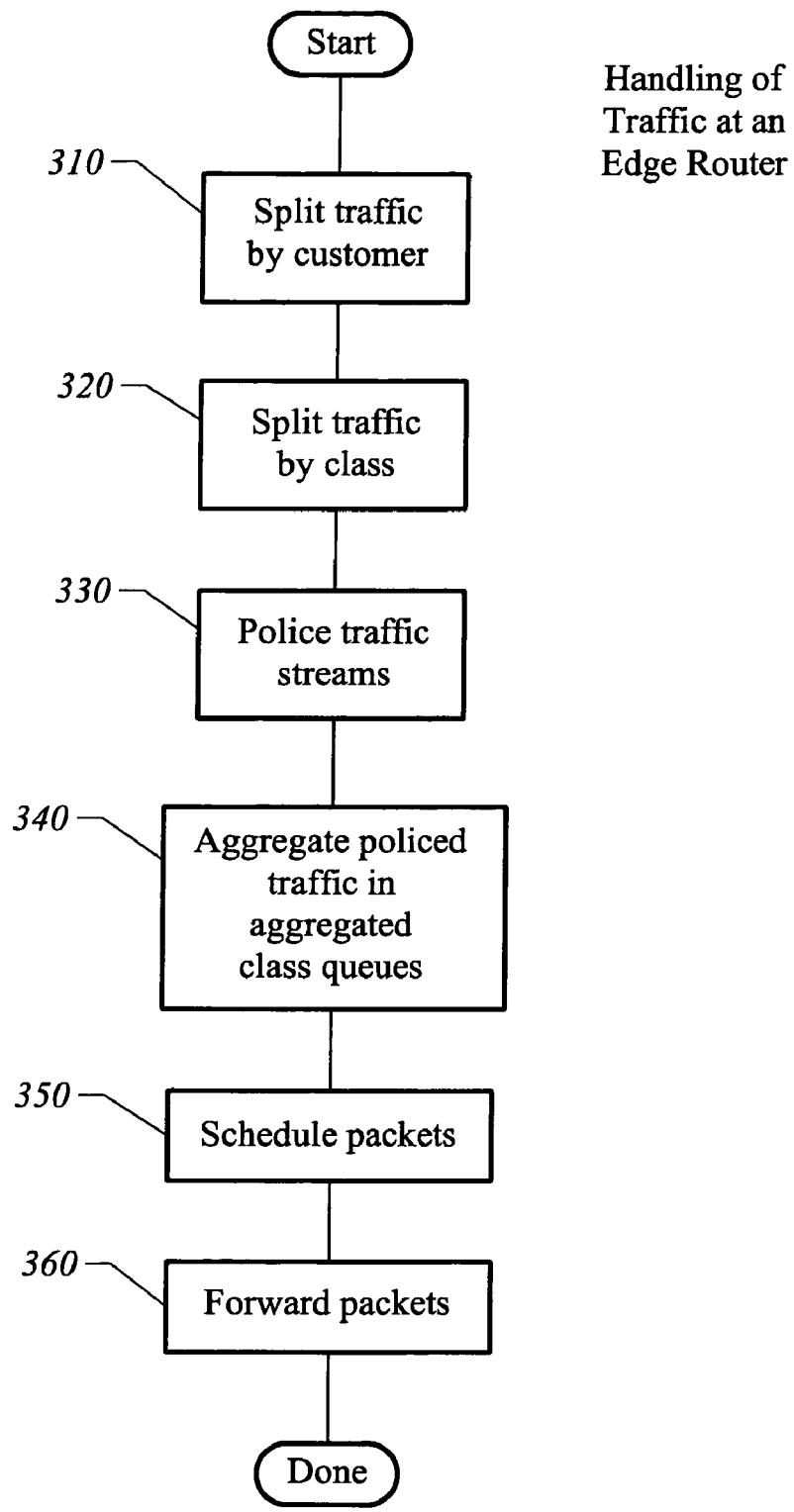
FIG. 5 is an example process flow diagram of handling traffic at an edge router.

An overview of typical handling of traffic at an edge router employing class queues is shown in FIG. 5. The traffic is split by customer at a step 310. Separating traffic by customer can be accomplished by having a physical interface, such as an input port, dedicated to a single customer, or can be accomplished by any known methods including using a hardware device that examines each packet header for a field indicating the customer. The field can for example be the source address or can be the VLAN identification number. At a step 320 each customer stream is then split into classes, preferably by referring to a Differentiated Service Code Point (DSCP) class field (also known as a priority field) in the packet header of each packet in the stream. At a step 330 each of these streams that has been separated by class and by customer, is policed. Steps 310-330 are typically performed very quickly and by hardware, and constitute a negligible portion of delay.

At a step 340 the policed traffic is sent to a class queue, which preferably includes packets of a given class for all customers. At a step 350 the packet at the head of the queue is scheduled, and at a step 360 the packet is forwarded to an output interface, as known in the art. Delay at a router is largely due to the queuing delay when the traffic waits in the queue to be scheduled. An embodiment of the invention provides a way to estimate worst-case queuing delay based on certain traffic measurements.

Figure 6:
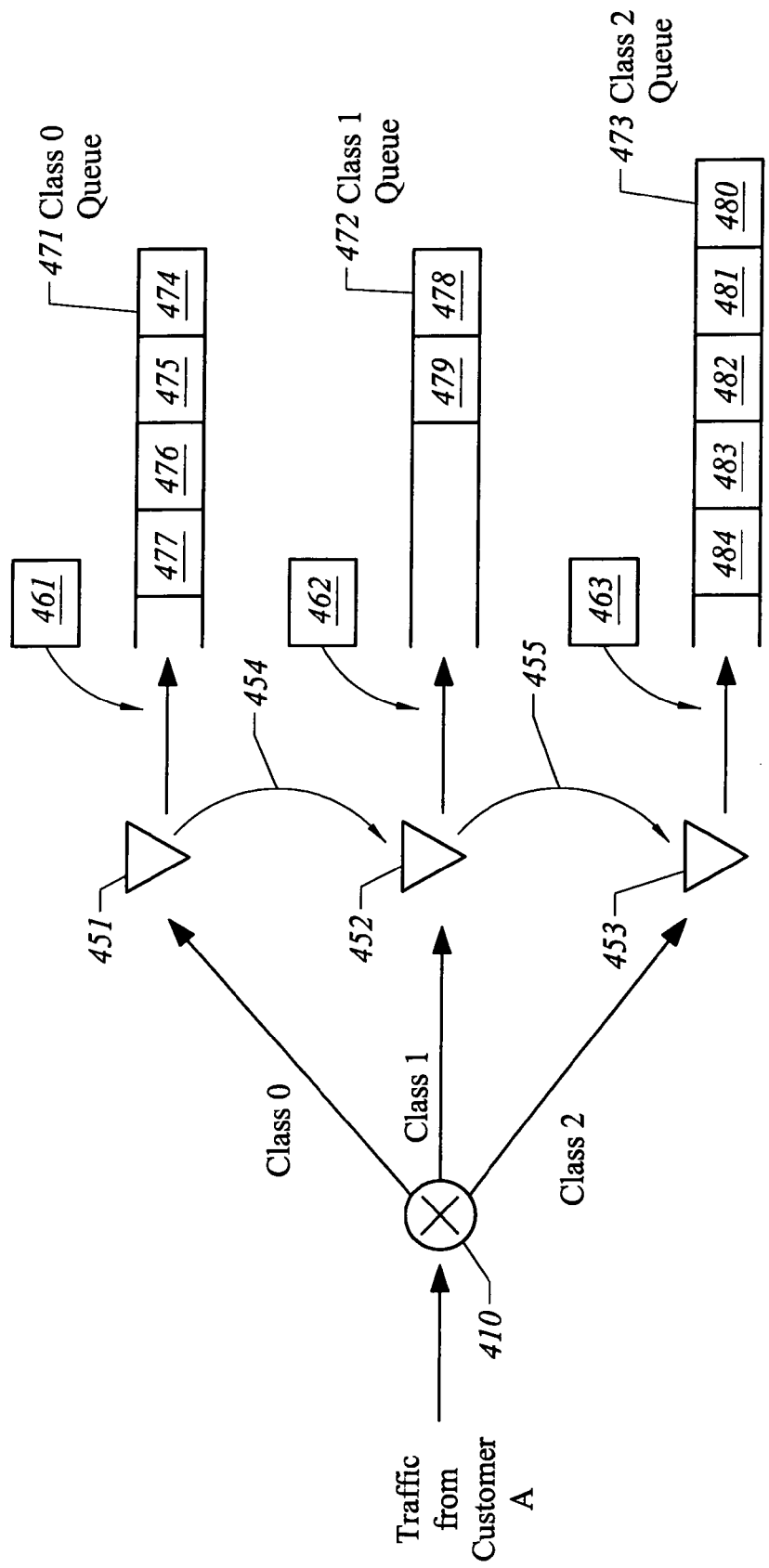
FIG. 6 is a schematic diagram showing traffic policing processing performed on a customer stream.

Referring now to FIG. 6, a diagram is shown of handling a traffic stream for a single customer, corresponding to steps 320-340 of FIG. 5. The customer traffic is comprised of packets. Each packet header preferably indicates the class of traffic. The traffic is split by class by a switch, which for example can be a hardware switch, but any known methods can be used.

Policing agents 451-453 can use any known methods for policing traffic to enforce conformity with the SLA, including token bucket policing, ask known in the art. Policing traffic may including degrading priority of packets as indicated by arrows 454-455 or by dropping packets. Typically, policing is performed only at an edge router between customer network and a service network. However, embodiments of the invention can be practiced in routers where no policing is performed or in networks that have no policing implemented.

The policed traffic is sent to queues 471-473, with each queue representing a class of traffic in a preferred embodiment. Queues 471-473 can be logical or physical queues. Squares 474-484 represent packets. Each queue is monitored. Monitors are shown as separate monitors 461-463; however, a single monitor can be used. Any known method of monitoring can be used. The monitors collect data about the packets in the queue as described in detail with regard to FIG. 7 below.

In a preferred embodiment, all traffic of a single class for multiple customers goes into the same queue. For example, class 0 traffic from several customers may be directed to queue 471 (not shown in FIG. 6). That is, traffic from customers B and C (not shown in FIG. 6) will also be directed to queue 471. However, traffic from customers A, B, and C will reside in different logical queues.

For a set of traffic data, given a value of r, an optimum value of b can be calculated, and vice versa. In embodiments of the invention, for a queue, the value of r is set to be the corresponding negotiated rate. For example, if the queue is a class 0 queue, the value of r is assumed to be the negotiated rate for class 0 traffic specified in the SLA.

Scheduling packets out of each queue is done using a deficit round robin algorithm, priority queue algorithm, or any other scheduling algorithm as known in the art, where packets are sent in round robin fashion. A quantum is given to each queue in every cycle if packets are less than the size of accumulated quantums waiting in the queue; otherwise, the packets is sent out and the quantum is decremented. When the queue is empty the quantum is set to zero. In addition, quantums never accumulate beyond a maximum value.

Figure 7:
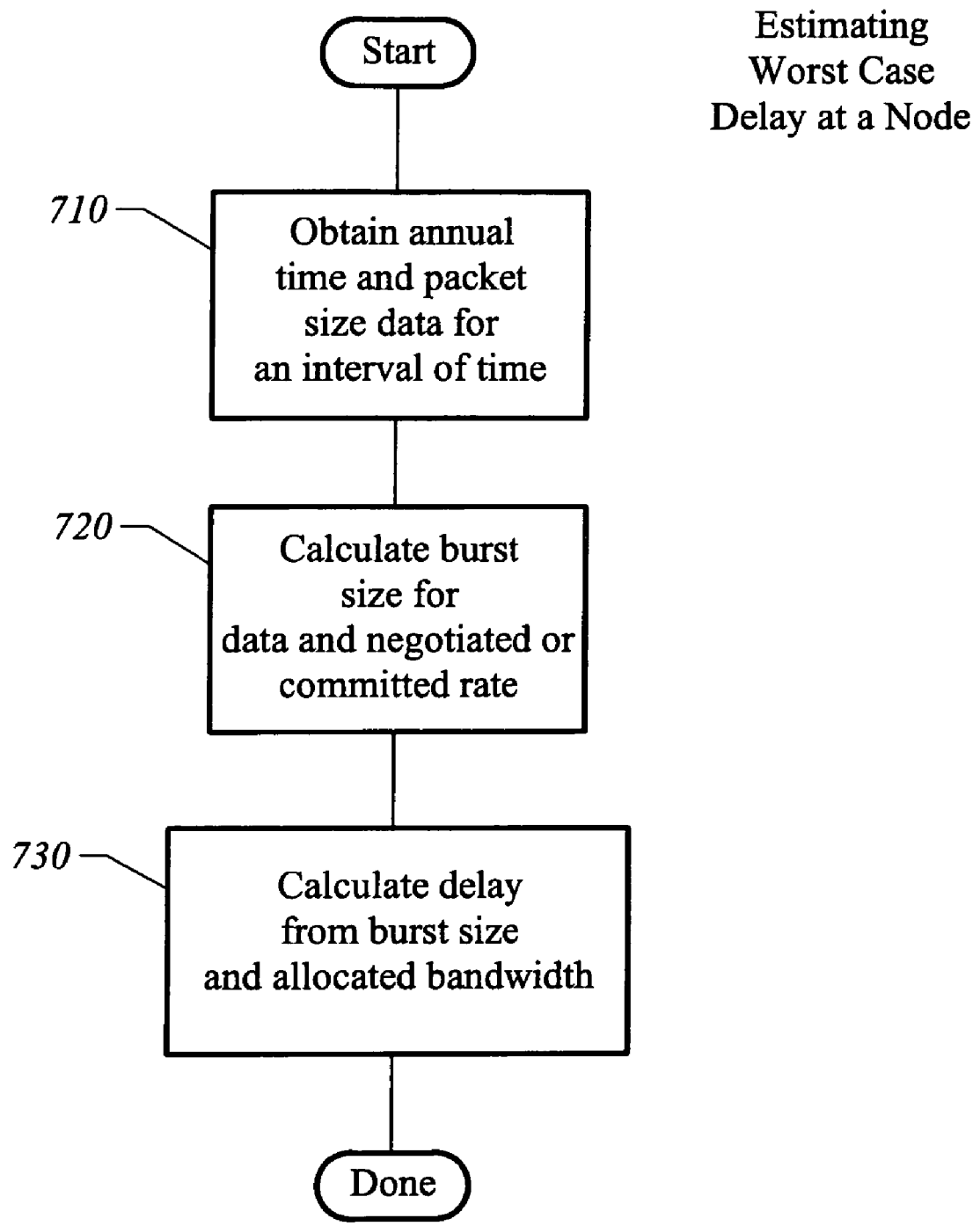
FIG. 7 is a process flow diagram of estimating periodic worst-case delay at a router.

A process flow diagram of estimating periodic worst-case delay at a router is shown in FIG. 7. The periodic worst-case delay is estimated for an period of time, such as 60 milliseconds.

At a step 710 data about the packets arriving at a queue of the router is collected. In the example embodiment the queue is a class queue and a logical queue. In a preferred embodiment the arrival time of the packet and the packet size are collected. The collection of this data is preferably performed by a monitor agent that is monitoring packet arrivals. The monitor agent is represented by reference numbers 461-463 of FIG. 6. It is to be noted that arrival time and packet size can be ascertained at the time of arrival of the packet. The packet need not be tracked for when it leaves the queue, as would be necessary if using a direct measurement method.

At a step 720, after the interval of time has passed, the burst size b is calculated for the collected data, with the rate parameter set to the negotiated rate for the class of traffic. In a preferred embodiment, the calculation is performed using one of the algorithms set forth in the "Network Traffic Characterization Using Token Bucket Model", which was incorporated by reference above.

At a step 730 the periodic worst-case delay estimate is calculated as the burst size divided by the allocated bandwidth, i.e. the output link capacity allotted to the queue corresponding to the class of traffic.

Figure 8:
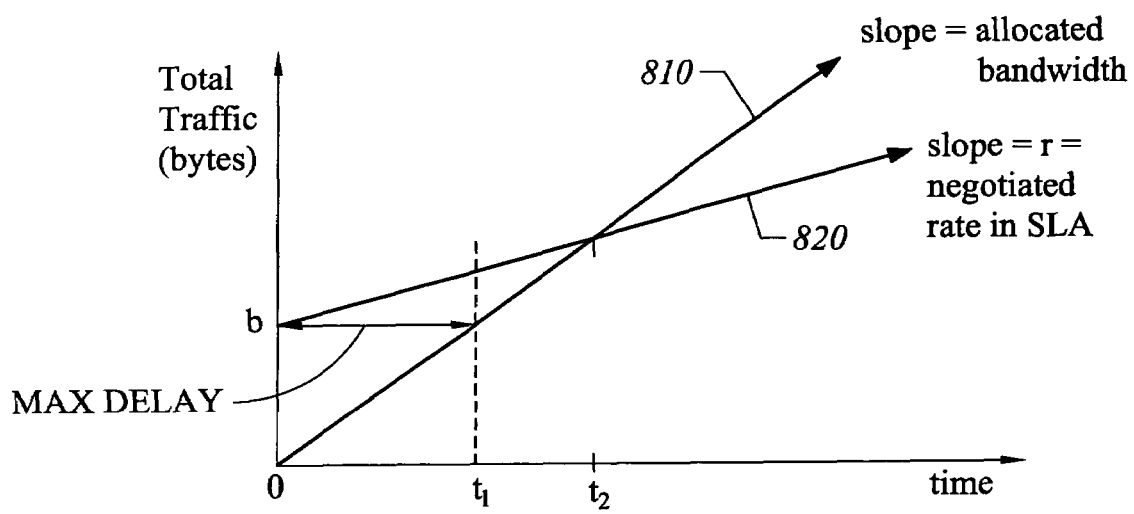
FIG. 8 is a plot showing a burst-rate profile and allocated bandwidth.

Referring now to FIG. 8, a plot including a burst-rate profile, having y-intercept b and slope r, referred to by number 820 is shown. The cumulative bandwidth line 810 has slope equal to the allocated bandwidth for the queue (the portion of the total link capacity allotted to the queue), and y-intercept 0. Line 810 represents the total amount of traffic that can be sent over the output link from a given class queue for a given customer versus time. Note that an assumption is that the allocated bandwidth (slope of line 810) exceeds or equals the average rate of traffic arrival (the negotiated rate, slope r of line 820), or the queue will overflow, and the performance will degrade catastrophically.

The estimated worst case delay is labeled as "MAX DELAY" on FIG. 8. Because the value of the burst-rate profile exceeds the actual data at all times, the periodic worst-case delay for the actual data will be less than or equal to the periodic worst-case delay for the burst-rate profile. Because the burst-rate profile is constrained to have the shape shown in FIG. 8 (a straight line with slope=r), the periodic worst-case delay can be seen graphically as the delay labeled on FIG. 8 (burst size divided by the allocated bandwidth rate). That is, the worst case occurs when there are no tokens in the token bucket, and a burst of size b occurs: in that case the time for sufficient tokens (i.e. b tokens) to accumulate is b divided by the allocated bandwidth.

Figure 9:
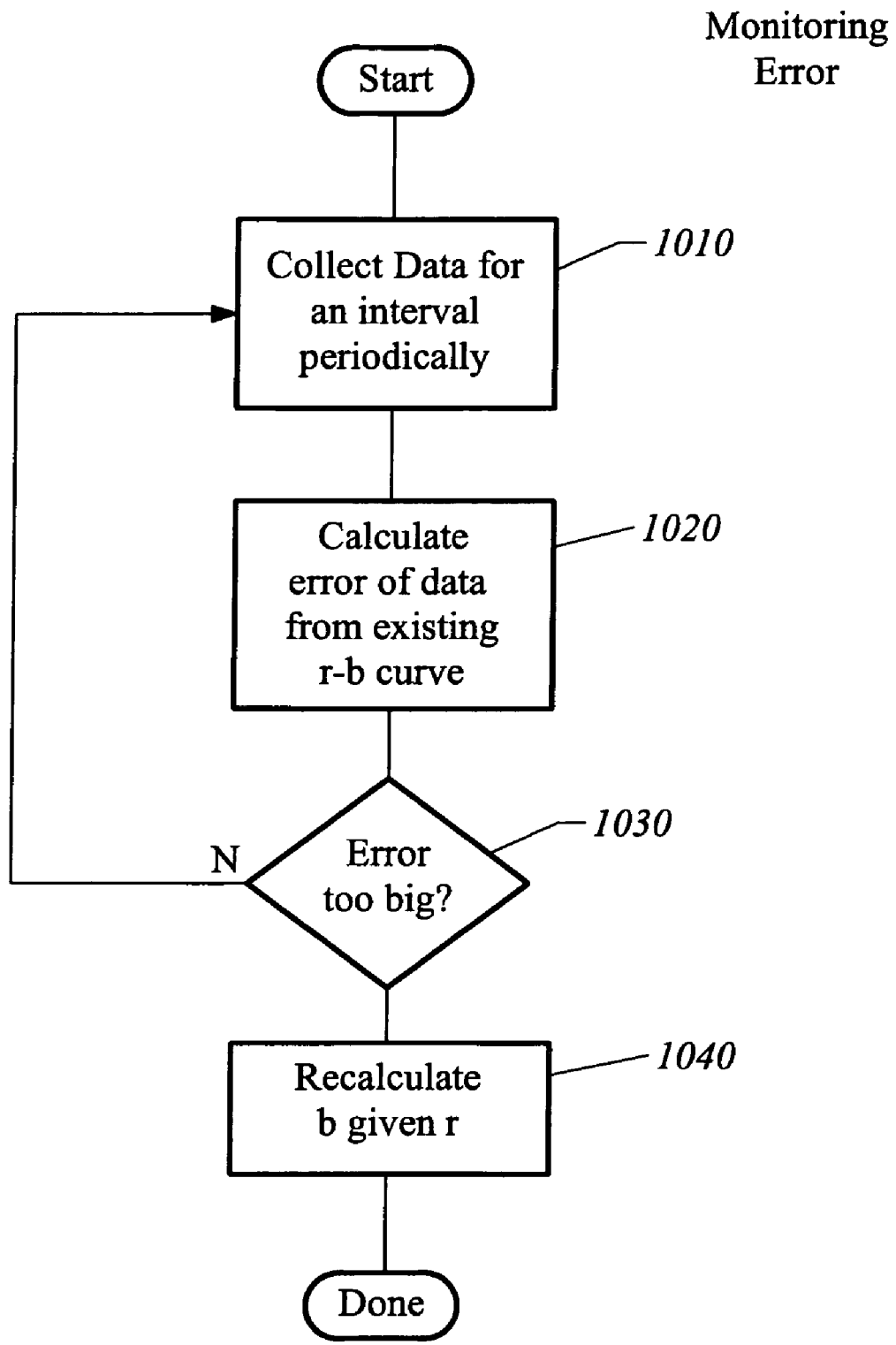
FIG. 9 is a process flow diagram of monitoring error.

Traffic can be relatively stationary (similar through time) or can vary through time. As long as the traffic is relatively stationary, b need not be recalculated. The traffic can be monitored for fit to the current traffic profile parameters and when a misfit is found, a new burst parameter b can be calculated. A process flow diagram for monitoring error is shown in FIG. 9. Periodically data is collected for an interval of time at a step 1010. The period can for example be every 0.5 seconds. Preferably the data includes the arrival time and size of all packets arriving during the interval of time. At a step 1020 the error of the data from the traffic profile defined by the rate parameter r (which preferably is set to the negotiated rate) and burst parameter b is calculated. The error of the data can be calculated by taking the difference of the data from the curve value, squaring it, and summing for all data points, or by any other known methods. At a step 1030 it is determined whether the error is acceptable. If the error is acceptable, the process returns to step 1010. If the error is unacceptable, then a new burst parameter b is calculated at a step 1040. The new burst parameter b can be calculated from the data that was collected in step 1010, or a new set of data can be collected (not shown). In this manner b need only be recalculated when the current b and r fail to fit the current traffic. Note that a change in b means that the worst case delay estimate also should be calculated.

Figure 10:
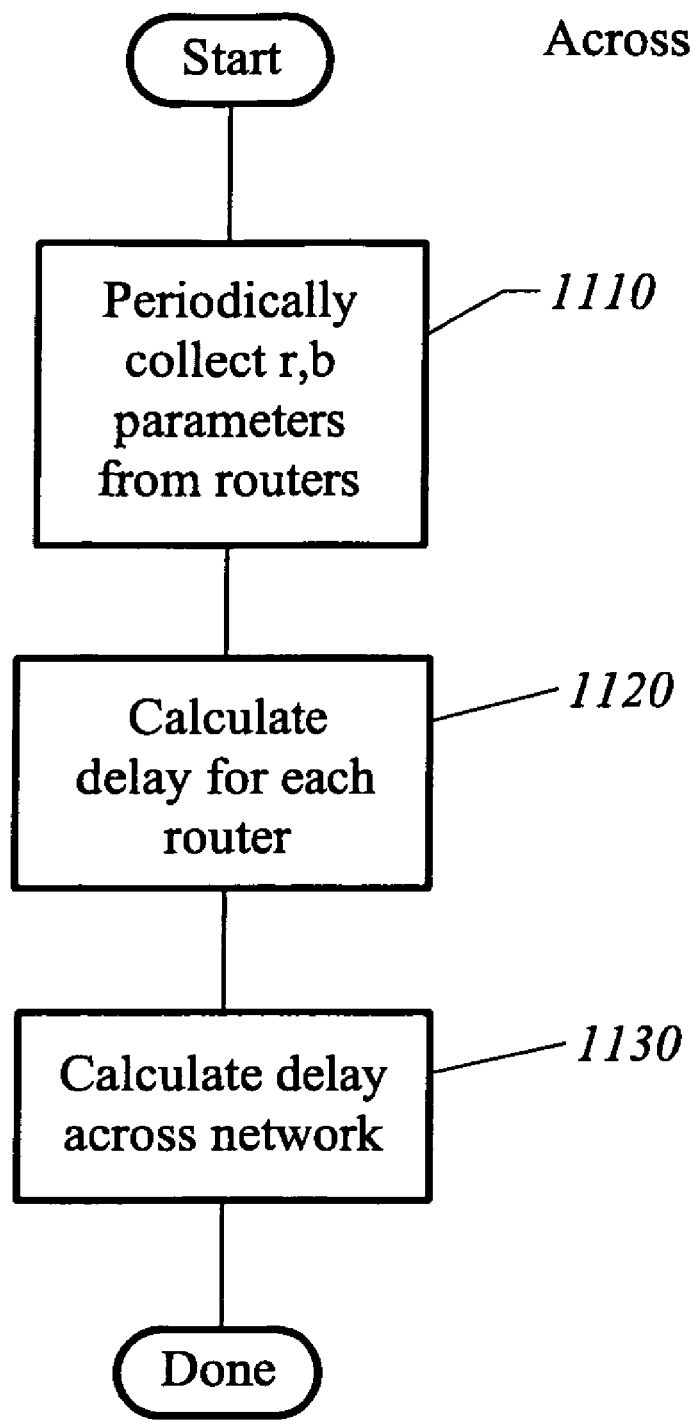
FIG. 10 is a process flow diagram of estimating delay across the network.

The traffic profile parameters, b given r, can be collected for every router in a network, and path delay calculated using this data. FIG. 10 is a process flow diagram of calculating delay across a network. At a step 1110, r and b parameters are periodically collected from each router in the network and collected at a central location. This can be accomplished for example by using an agent, as known in the art. The periodic worst-case delay is calculated from each burst-rate profile and the allocated bandwidth, preferably at the central location, as described above, at a step 1120. Alternatively, the delay can be calculated at each router, in which case the collecting agent can merely collect the delay and need not collect the r and b values. At a step 1130, the delay is calculated across the network for a selected path. This is accomplished by summing the delay for each router in the path.

It should be noted that because the delay at each router described here is associated with a single router (rather than a source-destination pair as in end-to-end measurement), this method is linear in number of network nodes (rather than quadratic as for end-to-end measurement.)

Figure 11:
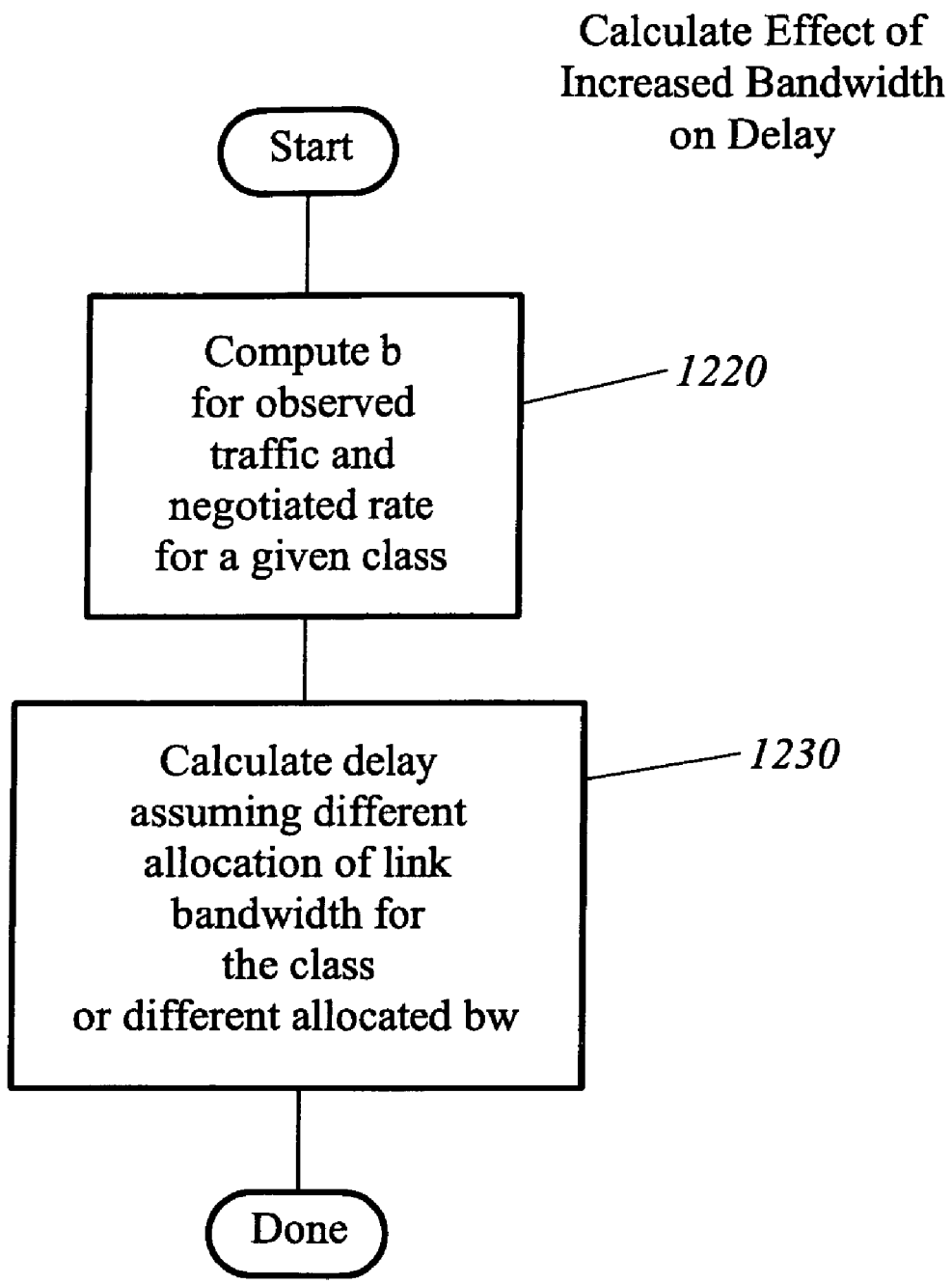
FIG. 11 is a process flow diagram of calculating the effect of increased bandwidth allocation on periodic worst-case delay.

Embodiments of the invention can also be used to calculate periodic worst-case delay for a new allocated bandwidth for a given class on an existing network as shown in FIG. 11. At a step 1220, a value of b is computed given rate parameter r being set to the negotiated rate for the class and observed traffic for an interval of time on the network, preferably using an algorithm as described in "Network Traffic Characterization Using Token Bucket Model", referenced above. At a step 1230 the periodic worst-case delay is calculated by dividing the value of b by the new allocated bandwidth. This can be used both for a provider to determine delay under different allocation of link bandwidth. Similarly, a value of b can be computed given a rate parameter r being set to a hypothetical negotiated rate to determine the effect on delay of a customer purchasing increased bandwidth.

While the above is a complete description of preferred embodiments of the invention, various alternatives, modifications, and equivalents can be used. It should be evident that the invention is equally applicable by making appropriate modifications to the embodiments described above. For example, the flowcharts are exemplary embodiments but steps may be added, deleted, combined, and reordered without departing from the spirit and scope of the invention. For example, the periodic worst-case delay can be calculated locally at each router; or, alternatively or additionally, the burst parameter and rate parameter values can be collected at a central location for each router in a network, and the delay for each router calculated centrally under various hypothetical class bandwidth allocation. Also for example, the rate parameters (negotiated rates) as well as the values for allocated bandwidth need not be collected periodically but can instead be stored at a central facility. Therefore, the above description should not be taken as limiting the scope of the invention that is defined by the metes and bounds of the appended claims along with their full scope of equivalents. Use of the system is not limited an edge router implementing the example handling of traffic shown in FIG. 5, but can be implemented in any router.

The foregoing describes embodiments of an invention that can provide an estimate of periodic worst-case delay for a traffic aggregate that can be implemented in very large networks without affecting network performance. In one embodiment, a queue is associated with a class of traffic, and the method can estimate periodic worst-case delay for all classes of traffic. In addition, embodiments of the invention provide a way to predict network behavior under changed conditions.

I claim:

1. In a packet switched computer network, a method of estimating periodic worst-case delay for a class of traffic having an associated rate, the method comprising:
    collecting traffic data at a queue of a router over a time interval, said queue associated with the class of traffic, the traffic data comprising packet size and arrival time of each packet arriving at the queue during the time interval;
    calculating at a hardware processor, a burst-rate traffic profile responsive to the traffic data collected at said queue over the time interval and the associated rate, wherein the associated rate is a specified bandwidth for the class of traffic and calculating the burst-rate traffic profile comprises calculating a burst parameter based on the associated rate;
    calculating at the hardware processor, a periodic worst-case delay for the burst-rate traffic profile by dividing the calculated burst parameter by a share of output link bandwidth allotted to said queue; and
    transmitting said calculated periodic worst-case delay to a central device that collects said calculated periodic worst-case delay from the router and other routers along a path in the computer network and adds up said calculated periodic worst-case delays;
    wherein the associated rate is set to a rate negotiated between a customer and a provider for the class of traffic.

2. The method of claim 1 wherein calculating the burst-rate traffic profile comprises utilizing a token bucket.

3. The method of claim 2 wherein the token bucket size corresponds to a maximum burst rate.

4. The method of claim 2 wherein a replenishment rate of the token bucket is based on the associated rate.

5. The method of claim 1 wherein the burst parameter is calculated utilizing token buckets.

6. The method of claim 1 wherein the associated rate is a maximum average bandwidth specified in a service level agreement.

7. The method of claim 1 wherein the burst-rate traffic profile comprises a y-intercept corresponding to the calculated burst parameter and a slope corresponding to the associated rate.

8. The method of claim 1 further comprising calculating a cumulative bandwidth profile having a slope equal to allocated bandwidth.

9. The method of claim 1 further comprising calculating error of data by comparing collected data to the burst-rate traffic profile.

10. The method of claim 9 further comprising calculating a new burst parameter if the error of data is higher than a predetermined limit.

11. The method of claim 1 further comprising calculating a hypothetical bandwidth allocation for said queue based on a specified periodic worst-case delay.

12. In a packet switched network, a method of estimating worst-case queuing delay along a path, said path comprising routers, the method comprising: periodically collecting at a central device, a rate parameter and a burst parameter associated with a queue for each of a plurality of routers, the burst parameter calculated based on a specified bandwidth;
    calculating by a hardware processor at the central device, a periodic worst-case delay associated with the rate and burst parameters for said each of a plurality of routers, wherein calculating a periodic worst-case delay comprises dividing the burst parameter by a share of output link bandwidth allotted to the queue, wherein the share of output link bandwidth is greater than or equal to the specified bandwidth; and adding up the calculated periodic worst-case delay associated with the routers along the path.

13. The method of claim 12 wherein the burst parameter is calculated utilizing token buckets.

14. The method of claim 12 wherein the rate parameter is a rate agreed to by a customer sending the traffic data.

15. In a packet switched network, a method of estimating periodic worst-case queuing delay for a class of traffic at a router, the class of traffic having a negotiated rate corresponding to a specified bandwidth for the class of traffic, the method comprising:

receiving packets at an input interface of a router;

sending each packet to one of a plurality of streams responsive to a customer identification;

sending each packet in at least one of the plurality of streams to one of a plurality of queues responsive to the class of traffic, the queue having the negotiated rate;

monitoring an arrival time and size of said each packet at the one of the plurality of queues during an interval of time;

calculating by a hardware processor, a burst-rate traffic profile responsive to the arrival time and size of said each packet and the negotiated rate, wherein calculating a burst-rate traffic profile comprises calculating a burst parameter based on the negotiated rate;

calculating by the hardware processor, a periodic worst-case delay for the burst-rate traffic profile by dividing the burst parameter by an output link capacity allotted to the queue corresponding to the class of traffic; and transmitting said calculated periodic worst-case delay to a central device that collects said calculated periodic worst-case delay from the router and other routers along a path in the computer network and adds up said calculated periodic worst-case delays.

16. The method of claim 15 further comprising calculating error of data by comparing collected data to the burst-rate traffic profile.

17. In a packet switched network, an apparatus for estimating worst-case delay for a class of traffic having an associated rate, the apparatus comprising:

a monitor that collects traffic data comprising arrival time and size of packets arriving at a queue of a router over a time interval, said queue associated with the class of traffic;

a hardware processor; and a computer readable medium coupled to the hardware processor and storing a computer program comprising:

code that causes the hardware processor to receive the traffic data comprising packet size and arrival time of each packet arriving at the queue during the time interval;

code that causes the hardware processor to calculate a burst-rate traffic profile responsive to the collected traffic data and the associated rate, wherein the associated rate is a specified bandwidth for the class of traffic and code that causes the hardware processor to calculate a burst-rate traffic profile comprises code that causes the hardware processor to calculate a burst parameter based on the associated rate;

code that causes the hardware processor to calculate a periodic worst-case delay for the traffic profile by dividing the burst parameter by a share of output link bandwidth allotted to the queue, wherein the associated rate is set to a rate negotiated between a customer and a provider for the class of traffic; and code that causes the hardware processor to transmit said calculated periodic worst-case delay to a central device that collects said calculated periodic worst-case delay from the router and other routers along a path in the computer network and adds up said calculated periodic worst-case delays.

18. An apparatus as in claim 17, wherein the computer readable medium is a CD-ROM, floppy disk, flash memory, system memory, or hard drive.

19. The apparatus of claim 17 wherein code that causes the hardware processor to calculate the burst-rate traffic profile comprises code that causes the hardware processor to utilize a token bucket.

20. The apparatus of claim 19 wherein the token bucket size corresponds to a maximum burst rate.

21. The apparatus of claim 17 wherein said share of output link bandwidth allotted to said queue comprises a hypothetical bandwidth allocation.

22. The apparatus of claim 17 wherein the negotiated rate comprises a hypothetical negotiated rate.

23. In a packet switched network, an apparatus for estimating periodic worst-case queuing delay along a path, said path comprising routers, the apparatus comprising:

a monitor agent that periodically collects traffic parameters associated with a queue for each of a plurality of routers and transmits said collected traffic parameters to a hardware processor, said collected traffic parameters comprising a burst parameter and a rate parameter; and a computer readable medium coupled to the hardware processor and storing a computer program comprising:

code that causes the hardware processor to receive said collected traffic parameters transmitted by the monitor agent;

code that causes the hardware processor to calculate a periodic worst-case delay associated with said collected traffic parameters for said each of a plurality of routers by dividing the burst parameter by a share of output link bandwidth allotted to the queue, wherein the share of output link bandwidth is greater than or equal to a specified bandwidth; and code that causes the hardware processor to add up the calculated periodic worst-case delay associated with the routers along the path.

24. The apparatus of claim 23, wherein the computer readable medium is a CD-ROM, floppy disk, flash memory, system memory, or hard drive.

25. In a packet switched network, an apparatus for estimating periodic worst-case delay for a class of traffic having an associated rate, the apparatus comprising:

hardware means for collecting traffic data comprising arrival time and size of packets arriving at a queue of a router over a time interval, said queue associated with the class of traffic, the traffic data comprising packet size and arrival time of each packet arriving at the queue during the time interval;

hardware means for calculating a burst-rate traffic profile responsive to the collected traffic data and the associated rate, wherein the associated rate is a specified bandwidth for the network and means for calculating the burst-rate traffic profile comprises means for calculating a burst parameter based on the associated rate;

hardware means for calculating a periodic worst-case delay for the traffic profile by dividing the burst parameter by a share of output link bandwidth allotted to said queue, wherein the associated rate is set to a rate negotiated between a customer and a provider for the class of traffic; and hardware means for transmitting said calculated periodic worst-case delay to a central device that collects said calculated periodic worst-case delay from the router and other routers along a path in the computer network and adds up said calculated periodic worst-case delays.

26. The apparatus of claim 25 wherein the burst-rate traffic profile comprises a y-intercept corresponding to the calculated burst parameter and a slope corresponding to the associated rate.

27. In a packet switched network, an apparatus for estimating periodic worst-case queuing delay along a path, said path comprising routers, the apparatus comprising:

hardware means for periodically collecting a traffic parameter comprising a rate parameter and a burst parameter associated with a queue for each of a plurality of routers, the burst parameter calculated based on a specified bandwidth;

hardware means for calculating a periodic worst-case delay associated with the traffic parameters for said each of a plurality of routers by dividing the burst parameter by a share of output link bandwidth allotted to said queue, wherein the share of output link bandwidth is greater than or equal to a specified bandwidth; and hardware means for adding up the calculated periodic worst-case delay associated with the routers along the path.

28. A computer program product for estimating periodic worst-case delay at a queue in a packet switched network, the computer program product comprising:

computer code that causes a hardware processor to collect traffic data comprising arrival time and size of packets arriving at the queue of a router over a time interval, said traffic data having a negotiated rate corresponding to a specified bandwidth for a class of traffic;

computer code that causes the hardware processor to calculate a burst traffic parameter for the collected traffic;

computer code that causes the hardware processor to calculate a burst-rate traffic profile responsive to the collected traffic data and the negotiated rate;

computer code that causes the hardware processor to calculate a periodic worst-case delay for the traffic profile by dividing the burst parameter by a share of output link bandwidth allotted to said queue, wherein the share of output link bandwidth is greater than or equal to the negotiated rate;

computer code that causes the hardware processor to transmit said calculated periodic worst-case delay to a central device that collects said calculated periodic worst-case delay from the router and other routers along a path in the computer network and adds up said calculated periodic worst-case delays; and a computer readable medium storing said computer code.

29. A computer program product for estimating worst-case queuing delay along a path in a packet switched network, said path comprising routers, the computer program product comprising:

computer code that causes a hardware processor to collect traffic parameters comprising a burst parameter and a rate parameter associated with a queue for each of a plurality of routers;

computer code that causes the hardware processor to calculate a periodic worst-case delay associated with the traffic parameters for said each of a plurality of routers by dividing the burst parameter by a share of output link bandwidth allotted to said queue, wherein the share of output link bandwidth is greater than or equal to a negotiated rate corresponding to a specified bandwidth for a class of traffic; and computer code that causes the hardware processor to add up the calculated delay associated with the routers along the path; and a computer readable medium storing said code.

30. In a packet switched network, a method of estimating worst-case queuing delay along a path, said path comprising routers, the method comprising:

periodically collecting at a central device, traffic data from said plurality of routers, said traffic data comprising a burst parameter calculated based on an associated rate, the associated rate comprising a specified bandwidth for a class of traffic;

calculating by a hardware processor at the central device, periodic worst-case delay associated with a queue for each of said plurality of routers by dividing the burst parameter by a share of output link bandwidth allotted to said queue, wherein the share of output link bandwidth is greater than or equal to the associated rate;

periodically collecting at the central device, periodic worst-case delay from each of said plurality of routers; and adding up at the central device, the calculated periodic worst-case delay associated with said plurality of routers along the path.

* * * * *